United States Patent
Degany

(10) Patent No.: US 8,529,164 B2
(45) Date of Patent: Sep. 10, 2013

(54) MILLING TOOL FOR MACHINING FIBER REINFORCED COMPOSITES AND MULTILAYER CUTTING INSERT THEREFOR

(75) Inventor: Yaron Degany, Kiryat Motzkin (IL)

(73) Assignee: Iscar, Ltd., Tefen (IL)

( * ) Notice: Subject to any disclaimer, the term of this patent is extended or adjusted under 35 U.S.C. 154(b) by 273 days.

(21) Appl. No.: 13/108,659

(22) Filed: May 16, 2011

(65) Prior Publication Data

US 2011/0280673 A1    Nov. 17, 2011

(30) Foreign Application Priority Data

May 17, 2010   (IL) .......................................... 205811

(51) Int. Cl.
*B23C 5/10*   (2006.01)

(52) U.S. Cl.
USPC ................................ 407/53; 407/61; 407/118

(58) Field of Classification Search
USPC ........................... 407/118, 119, 53, 32, 54, 61
See application file for complete search history.

(56) References Cited

U.S. PATENT DOCUMENTS

| | | | | |
|---|---|---|---|---|
| 817,502 | A * | 4/1906 | Mitchell | 407/53 |
| 4,655,648 | A * | 4/1987 | Hellbergh | 407/42 |
| 4,854,784 | A * | 8/1989 | Murray et al. | 407/114 |
| 5,193,944 | A | 3/1993 | Nishimura | |
| 5,232,320 | A * | 8/1993 | Tank et al. | 408/145 |
| 5,310,293 | A * | 5/1994 | Notter et al. | 408/145 |
| 5,586,843 | A | 12/1996 | Minicozzi | |
| 5,672,031 | A | 9/1997 | Oles | |
| 5,810,519 | A | 9/1998 | Vogel et al. | |
| 5,924,824 | A * | 7/1999 | Satran et al. | 407/34 |
| 7,367,753 | B2 | 5/2008 | Maurer | |
| 8,176,825 | B1 * | 5/2012 | Isaacson et al. | 83/835 |
| 2006/0280568 | A1 | 12/2006 | Craig | |
| 2007/0071560 | A1 | 3/2007 | Karonen | |
| 2007/0274790 | A1 | 11/2007 | Maurer | |
| 2007/0280792 | A1 * | 12/2007 | Kochan et al. | 407/53 |

FOREIGN PATENT DOCUMENTS

| | | |
|---|---|---|
| DE | 3405211 A1 | 8/1985 |
| DE | 10215875 A1 | 10/2003 |
| DE | 10218991 A1 | 11/2003 |
| EP | 0714719 A1 | 6/1996 |
| GB | 2404890 A | 2/2005 |

(Continued)

OTHER PUBLICATIONS

International Search Report dated Aug. 31, 2011 issued in counterpart PCT application (No. PCT/IL2011/000385).

*Primary Examiner* — Daniel Howell
*Assistant Examiner* — Nicole N Ramos
(74) *Attorney, Agent, or Firm* — Womble Carlyle

(57) ABSTRACT

A multilayer cutting insert includes a first layer made of a first material and a second layer made of a second material. The first material is harder than the second material. The cutting insert has opposing first and second major side surfaces and a peripheral side surface which extends therebetween. The first major side surface is formed in the first layer and includes a non-uniform relief surface. The peripheral side surface is formed in the two layers and includes a non-uniform rake surface. The rake surface and the relief surface intersect at an edge, at least portion of which is a curved major cutting edge. The rake surface is formed in at least the first layer, and the relief surface is formed only in the first layer.

28 Claims, 4 Drawing Sheets

(56) References Cited

FOREIGN PATENT DOCUMENTS

| | | | |
|---|---|---|---|
| JP | 08141817 A | * | 6/1996 |
| JP | 2000246532 A | * | 9/2000 |
| JP | 2004344984 A | * | 12/2004 |
| JP | 2005313287 A | * | 11/2005 |
| WO | WO 93/17822 A1 | | 9/1993 |
| WO | WO 96/29172 A1 | | 9/1996 |
| WO | WO 2006/138121 A2 | | 12/2006 |
| WO | WO 2007/037734 A1 | | 4/2007 |

* cited by examiner

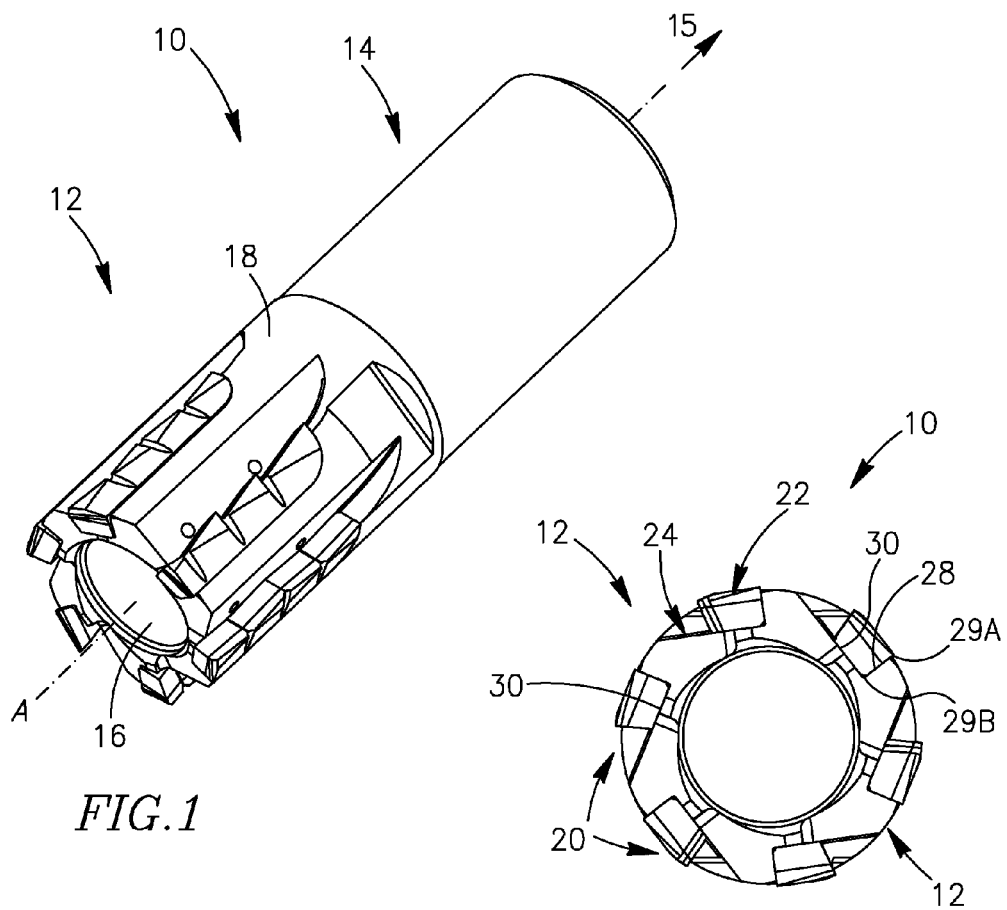
FIG.1
FIG.2
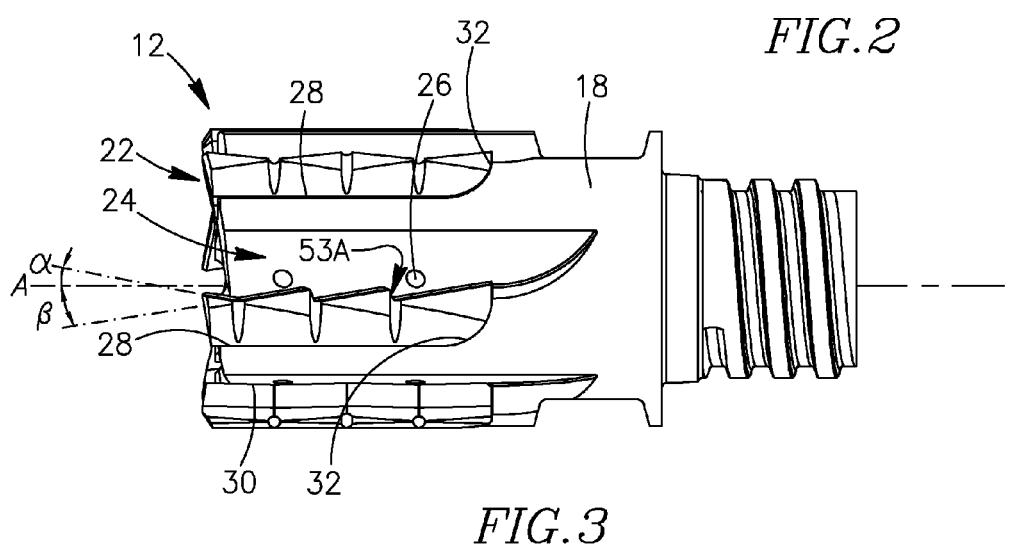
FIG.3

MILLING TOOL FOR MACHINING FIBER REINFORCED COMPOSITES AND MULTILAYER CUTTING INSERT THEREFOR

FIELD

The subject matter of the present application relates to milling tools for machining fiber reinforced composites, and in particular to cutting inserts for such milling tools.

BACKGROUND

Milling tools for machining fiber reinforced composites can include cutting inserts having a super-abrasive layer such as Polycrystalline Diamond (PCD) or Cubic Boron Nitride (CBN). Examples of cutting inserts having a super-abrasive layer are disclosed in U.S. Pat. Nos. 5,672,031, and 7,367,753.

SUMMARY

In accordance with a first aspect of the subject matter of the present application, there is provided a multilayer cutting insert that has a first layer made of a first material and a second layer made of a second material, the first material being harder than the second material. The cutting insert includes opposing first and second major side surfaces and a peripheral side surface which extends therebetween. The first major side surface is formed in the first layer and includes a non-uniform relief surface. The peripheral side surface is formed in the two layers and includes a non-uniform rake surface. The rake surface and the relief surface intersect at an edge, at least portion of which is a curved major cutting edge. The rake surface is formed in at least the first layer, and the relief surface is formed only in the first layer.

In accordance with a further aspect of the subject matter of the present application, there is provided a milling tool which includes a cylindrical tool head with an end surface and a peripheral side surface which extends rearwardly from the end surface. The peripheral side surface includes an evacuation flute and a cutting insert pocket adjacent the flute. A tool shank extends rearwardly from the tool head. The milling tool further includes the multilayer cutting insert tangentially secured in the cutting insert pocket.

A cutting insert according to this aspect can have any of the features described hereinabove and below.

BRIEF DESCRIPTION OF THE DRAWINGS

For a better understanding of the subject matter of the present application and to show how the same can be carried out in practice, reference will now be made to the accompanying drawings, in which:

FIG. 1 is an isometric view of a milling tool;
FIG. 2 is an end view of the milling tool in FIG. 1;
FIG. 3 is a side view of a cutting head and cutting inserts of the milling tool in FIGS. 1 and 2.

Figure 4:
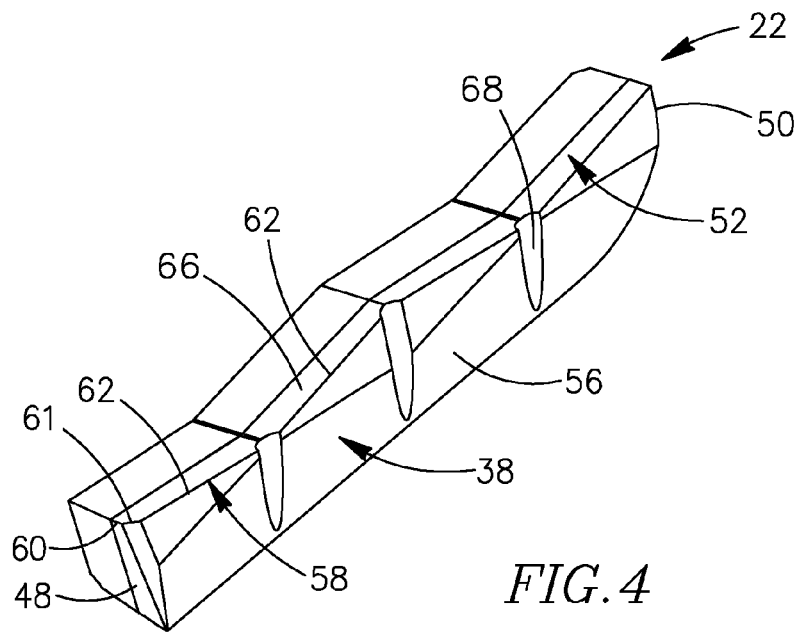
FIG. 4 is an isometric view of a cutting insert of the milling tool in FIGS. 1 to 3.

It will be appreciated that for simplicity and clarity of illustration, elements shown in the figures have not necessarily been drawn to scale. For example, the dimensions of some of the elements can be exaggerated relative to other elements for clarity, or several physical components can be included in one functional block or element. Further, where considered appropriate, reference numerals can be repeated among the figures to indicate corresponding or analogous elements.

DETAILED DESCRIPTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific details presented herein.

Reference is made to FIGS. 1 to 3, showing a milling tool 10 in accordance with the subject matter of the present application. The milling tool 10 includes a cutting head 12 and a tool shank 14 attached thereto.

For ease of explanation, an axis of rotation A is shown extending through the center of the milling tool 10 along the length thereof, and an arrow, designated by the numeral 15, which is coaxial with axis A, indicates a reference direction which will be referred to as "rearward" hereinafter. Use of the term "forward" hereinafter, in connection with a direction, refers to a direction opposite to the rearward direction 15.

The cutting head 12 has an end surface 16 and a cutting head peripheral surface 18 extending rearwardly therefrom. The cutting head peripheral surface 18 includes, although is not limited to, six cutting insert pockets 20.

A single cutting insert is mounted tangentially in each cutting insert pocket 20. One particular cutting inserts is designated as 22 (FIGS. 2 and 3) and will be used as an example for illustrative purposes. It will be understood that, unless excluded explicitly, all features of the cutting insert designated by the numeral 22 can be associated with cutting inserts in accordance with the subject matter of the present application, and that the detailed description and numeral listing in the claims uses the numeral 22 for ease of understanding only.

The term "tangentially mounted" is defined hereinbelow with respect to the geometry of the cutting insert 22 and cutting insert pocket 20.

Each cutting insert pocket 20 has an associated evacuation flute 24 formed in the cutting head peripheral surface 18. The cutting head can be formed with at least one duct 26 associated with each evacuation flute 24. The at least one duct 26 can be configured, for example, for conveyance of gas or coolant, to aid chip evacuation.

The cutting insert pocket 20 comprises a pocket base surface 28, and first and second walls (30, 32).

The pocket base surface 28 faces in the direction of rotation of the milling tool 10, which in this example is counter-clockwise about axis A, and extends rearwardly from the end surface 16 of the milling tool 10. The pocket base surface 28 comprises an outermost edge 29A at the peripheral surface 18, and an innermost edge 29B, which is closer to the center of the milling tool 10 than the outermost edge 29A.

The first wall 30 is coextensive with the pocket base surface 28 along the innermost edge 29B thereof, faces radially outwardly from the center of the milling tool 10, and extends rearwardly from the end surface 16.

The second wall 32 extends from the pocket base surface 28 and the first wall 30 at portions thereof distal from the end surface 16 of the milling tool 10 and at least partially faces to the end surface 16 of the milling tool 10.

Figure 5:
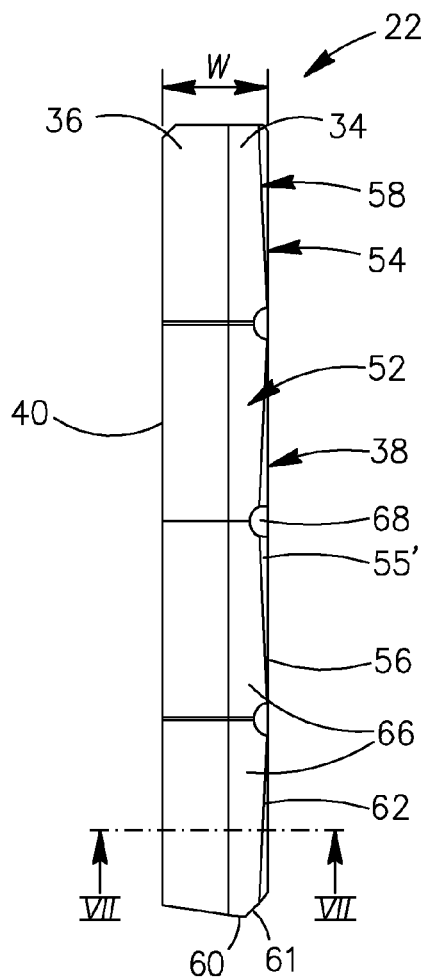
FIG. 5 is a top view of the cutting insert in FIG. 4.
Figure 6:
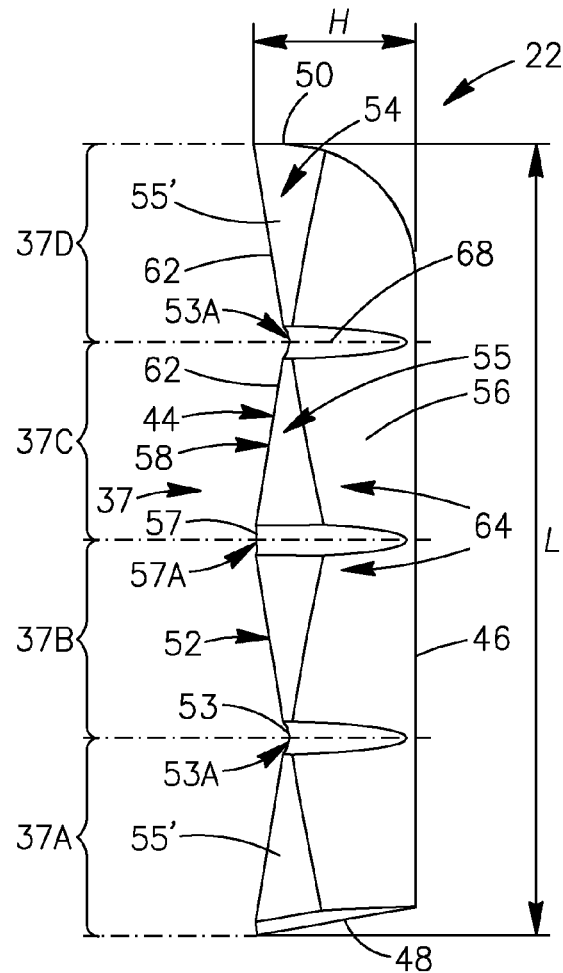
FIG. 6 is a side view of the cutting insert in FIG. 4.
Figure 7:
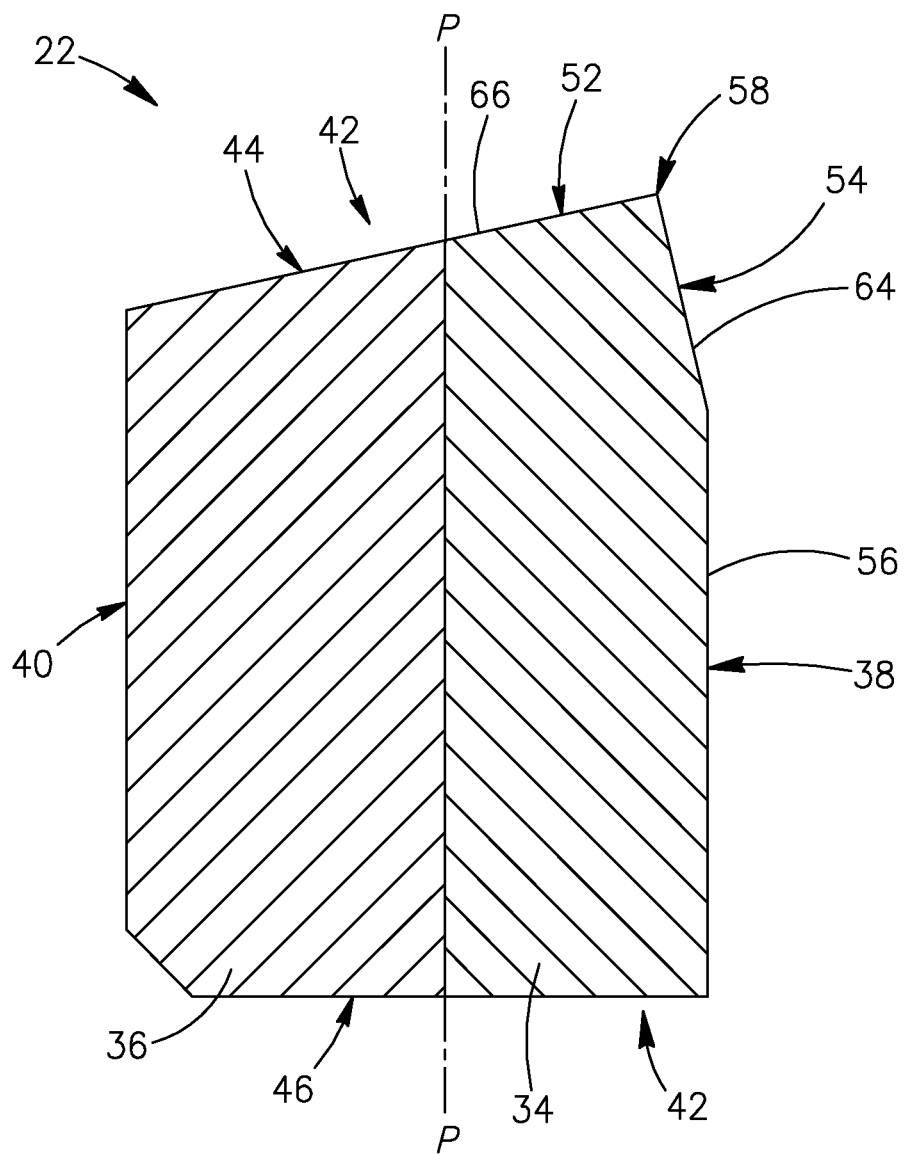
FIG. 7 is a cross section view taken along line VII-VII in FIG. 5.

Attention is drawn to FIGS. 4 to 6. The cutting insert 22 is single-sided and non-indexable and includes a first layer 34 and a second layer 36, defining a plane P therebetween. When the cutting insert 22 is mounted on the milling tool 10, the plane P has a tangential orientation.

The first layer 34 can be made of a super-abrasive material. It has been found that super-abrasive materials can provide excellent results for cutting inserts in accordance with the subject matter of the present application. In this example the first layer 34 is made of Polycrystalline Diamond (PCD), which is the material which has been found, thus far, to have the most suitable qualities, however it is still possible to use other super-abrasive materials such as, for example, Cubic Boron Nitride (CBN).

The second layer 36 can be made of sintered cemented carbide, for example, tungsten carbide, although other suitable materials can also be used.

The second layer 36 is devoid of cutting edges, and relief surfaces.

The cutting insert 22 is manufactured from a single blank. The blank comprises the layer of super-abrasive material on the second layer 36.

Each layer of the cutting insert 22 is of a unitary one-piece construction. To elaborate, even when a layer is formed with a plurality of segments 37, the segments 37 are not separate pieces formed and then joined together by mechanical or other means, but rather are formed as a unity and are therefore devoid of connection areas therebetween. However it will be understood that there is a connection area of the cutting insert 22 being along plane P between the first layer 34 and second layer 36 as described hereinbefore.

The cutting insert 22 includes two opposing major side surfaces, a first major side surface 38 and a second major side surface 40, and a peripheral side surface 42 extending therebetween.

The peripheral side surface 42 has opposing top and bottom surfaces 44, 46 and two opposing minor side surfaces, a front minor side surface 48 and a rear minor side surface 50, extending between top and bottom surfaces 44, 46. The rear minor side surface 50 can be curved and joins the bottom surface 46 via a curved corner.

The first and second major side surfaces (38, 40) are associated with the length L and height H dimensions, whereas the minor side surfaces are associated with the width H and height H dimensions. The major surfaces having a greater area than the minor side surfaces.

The top and bottom surfaces 44, 46 are each formed in the first and second layers 34, 36. The first major side surface 38 is formed in the first layer 34. The second major side surface 40 is formed in the second layer 36. The cutting insert 22 includes a non-uniform rake surface 52 formed in the top surface 44, and a non-uniform relief surface 54 formed in the first major side surface 38. The non-uniform relief surface 54 is located only in the first layer 34.

The maximum distance between the top and bottom surfaces 44, 46 defines the height H, the maximum distance between the first and second major side surfaces 38, 40 defines the width W, and the maximum distance between the front and rear minor side surfaces 48, 50 defines the length L.

The cutting insert 22 has an elongated shape with a length L, a width W and a height H, wherein L>W and L>H. The dimensions of the cutting insert can also fulfill the condition H>W.

The relief surface 54, includes a non-uniform primary relief surface 55 which extends from the major cutting edge 58 and connects with a secondary relief surface 56 which extends from the primary relief surface 55 to the bottom surface 46.

The rake surface 52 is formed at least in the first layer 34 but can also be formed at least partially in the second layer 36. The width of the rake surface 52 depends on various machining parameters, such as the feed rate.

The relief surface 54 meets the rake surface 52 at a major cutting edge 58. The location of the rake surface 52 and the relief surface 54 with respect to the first and second layers 34, 36 determines the tangential orientation of the cutting insert 22 when it is mounted on the milling tool 10. When the cutting insert is mounted in its respective insert pocket 20 the top surface 44 faces in the direction of rotation of the milling tool 10 and the first major side surface 38 faces radially outwardly.

The term "non-uniform" as applied to a surface is used throughout the description and claims to mean a surface with a varying surface topography. Therefore, a non-uniform surface is a surface which is curved or a plurality of curved sub-surfaces, or which is formed from a number of non-coplanar sub-surfaces. The non-coplanar sub-surfaces can each be planar or curved, or a combination of both.

The primary relief surface 55 comprises primary relief surface sections 55'. Each primary relief surface section 55' and the secondary relief surface 56 are non-coplanar. The front minor side surface 48 meets the top surface 44, at least partially, at a minor cutting edge 60. The minor cutting edge 60 can connect with the major cutting edge 58 via a corner cutting edge 61 (as shown in FIGS. 4 and 5). The minor cutting edge 60 is transverse to the major cutting edge 58. The minor cutting edge 60 is formed in at least the first layer 34. The minor cutting edge can be used for ramping operations. The major cutting edge 58 is curved. The major cutting edge 58 can lie, on a curved, cylindrical surface if it is required to produce a curved cylindrical surface in the workpiece. It should be noted that the curvature of the cutting edge 58 cannot be seen in the drawings due to the relatively large radius of curvature thereof. With respect to fiber-reinforced composites, a high surface quality is one in which there are almost no residue fibers left on the workpiece surface or on its edges. The cutting insert 22, when mounted on the milling head 12, can have different axial angles. For example, at least a portion of the major cutting edge 58 can have a positive axial angle α (FIG. 3) and at least another portion thereof can have a negative axial angle β (FIG. 3), the major cutting edge 58 can have only a positive axial angle, or the major cutting edge 58 can have only a negative axial angle.

The major cutting edge 58 can comprise a plurality of cutting edge sections 62, each cutting edge section 62 has an associated relief surface section 64 and an associated rake surface section 66.

Adjacent cutting edge sections 62 are non-collinear in a side view. At least one adjacent pair of the cutting edge sections 62 can converge inwardly to form a trough 53 (as seen in a side view of the cutting insert 22 in FIG. 6). At least one pair of cutting edge sections 62 can converge outwardly, and meet at an apex 57 in the cutting edge 58. Adjacent cutting edge sections 62 which converge towards each other can significantly reduce the amount of residue fibers in fiber-reinforced composites, since the fibers are at least partially urged by the cutting edge sections 62 towards the region of the trough 53. In a side view of the cutting insert 22, alternate cutting edge sections 62 can be parallel to each other, while adjacent cutting edge sections 62 are not.

Each relief surface section 64 includes a primary relief surface section 55', and a portion of the secondary relief surface 56 extending therefrom.

The cutting insert 22 can include four segments 37 (in the example in FIG. 6 there are four segments shown and designated 37A, 37B, 37C, and 37D). Each segment 37 includes a cutting edge section 62, an associated relief surface section 64 and an associated rake surface section 66.

In the specification and claims, referring to FIG. 6 for the purposes of illustration only, a boundary between adjacent segments (in FIG. 6 the segments being designated as 37A, 37B, 37C and 37D) is a midpoint of a trough 53A or midpoint of an apex 57A. A further example is shown in FIG. 3 where a trough 53A is shown as a boundary between two segments, both of which having a negative axial angle β

With a segmented arrangement, a possible advantage thereof is that a single cutting insert 22 can be used instead of a plurality of smaller cutting inserts, making the tool cheaper to manufacture since it is easier and takes less time to solder, or braze by hand, a single large cutting insert 22 as opposed to, four example, four smaller ones.

Yet another possible advantage of the cutting insert 22 can be its tangential orientation when mounted on the milling tool 10. A curved segmented cutting edge 58 in accordance with the subject matter of the present application can be made by performing certain operations (such as WEDM—Wire Electrical Discharge Machining) on the relief and rake surfaces 54, 52. The cutting edge 58 is only a part of the super-abrasive layer. With a radially oriented layered cutting insert the dimension of the variation of the cutting edge perpendicular to the rake surface 52 is limited by the thickness of the super-abrasive layer. However, with the tangentially oriented cutting insert 22 of the subject matter of the present application the dimension of the variation of the cutting edge 58 perpendicular to the rake surface 52 is limited by the total height H of the cutting insert 22, which can be larger than width W, and which is larger than the thickness of the super-abrasive layer. Therefore, the cutting insert 22 in accordance with the subject matter of the present application can be produced with a relatively large axial angle in comparison with a radially orientated cutting insert.

The term "tangential" when used in connection with mounting or orientation, in the description and claims, refers to a parallel orientation of a planar body or a plane, which is perpendicular to a plane in which the rotation axis A lies. On the other hand, a radial orientation of a planar body or a plane means a parallel orientation to a plane in which the rotation axis A lies.

The cutting insert 22 can be provided with stress relief recesses 68 formed at the major cutting edge 58 in the first layer 34 between adjacent cutting edge sections 62. The stress relief recesses 68 extend in the relief surface 54 away from the major cutting edge 58 between relief surface sections 64. The stress relief recesses 68 provide relief against stress concentration in the super-abrasive material in the region between adjacent cutting edge sections 62.

Figure 8:
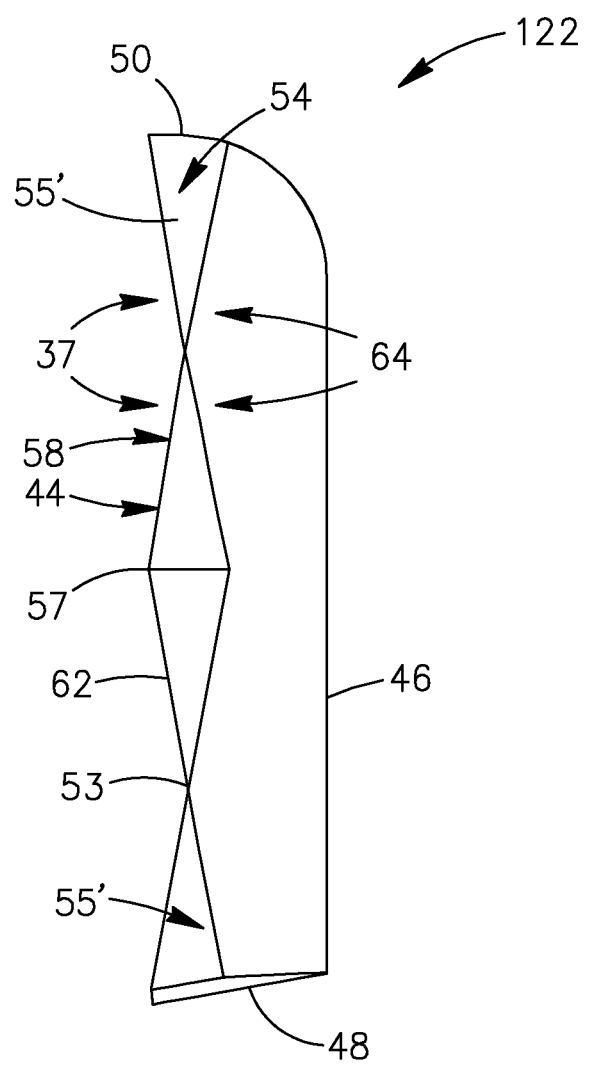
FIG. 8 is a side view of another example of a cutting insert.

Another example cutting insert 122 is shown in FIG. 8. Cutting insert 122 differs from cutting insert 22 in that it is devoid of relief recesses 68. The cutting insert 122 has a continuous, full-effective cutting edge 58. In such case, a possible advantage of such construction, which is shared with cutting insert 22, is that a single cutting insert 22, 122 can be utilized instead of multiple smaller cutting inserts. Such construction can lead to a compact milling tool, i.e. a single, segmented cutting insert 122 with a full-effective cutting edge, can occupy a space up the equivalent tangential width of a single longitudinal row of small cutting inserts with a half-effective cutting edge.

The cutting insert 22 can be secured to a cutting insert pocket 20 by mounting thereof in the cutting insert pocket 20 and brazing the second major side surface 40 to the first wall 30, the bottom surface 46 to the base surface 28 and the rear minor side surface 50 to the second wall 32.

While the subject matter of the present application has been described with reference to one or more specific embodiments, the description is intended to be illustrative as a whole and is not to be construed as limiting the subject matter of the present application to the embodiments shown. It is appreciated that various modifications can occur to those skilled in the art that, while not specifically shown herein, are nevertheless within the scope of the subject matter of the present application.

What is claimed is:

1. A multilayer cutting insert (22) comprising a first layer (34) made of a first material and a second layer (36) made of a second material, the first material being harder than the second material,
   the multilayer cutting insert (22) comprising opposing first and second major side surfaces (38, 40) and a peripheral side surface (42) extending therebetween;
   the first major side surface (38) being formed in the first layer (34) and comprising a non-uniform relief surface (54);
   the peripheral side surface (42) being formed in the two layers and comprising a non-uniform rake surface (52), and the rake surface (52) and the relief surface (54) intersecting at an edge, at least portion of which is a curved major cutting edge (58);
   the rake surface (52) being formed in at least the first layer (34) and the relief surface (54) being formed only in the first layer (34), wherein
   the second layer (36) is devoid of cutting edges and relief surfaces.

2. The multilayer cutting insert (22) according to claim 1, wherein the major cutting edge (58) connects with a minor cutting edge (60) via a corner cutting edge (61).

3. The multilayer cutting insert (22) according to claim 1, wherein the major cutting edge (58) comprises a plurality of cutting edge sections (62).

4. The multilayer cutting insert (22) according to claim 3, wherein one adjacent pair of the plurality of cutting edge sections (62) converge inwardly, and meet at a trough (53).

5. The multilayer cutting insert (22) according to claim 1, wherein the rake surface (52) comprises a plurality of rake surface sections (66).

6. The multilayer cutting insert (22) according to claim 1, wherein the second layer (36) is made of sintered carbide.

7. The multilayer cutting insert (22) according to claim 1, wherein a maximum distance between the top and bottom surfaces (44, 46) defines a height H, a maximum distance between the first and second major side surfaces (38, 40) defines a width W, and a maximum distance between the front and rear minor side surfaces (48, 50) defines the length L; and wherein L>W, L>H and H>W.

8. The multilayer cutting insert (22) according to claim 1, wherein the cutting insert (22) is single-sided and non-indexable.

9. The multilayer cutting insert (22) according to claim 1, wherein the relief surface (54) comprises a non-uniform primary relief surface (55) which extends from the cutting edge (58) and connects with a secondary relief surface (56).

10. The multilayer cutting insert (22) according to claim 9, wherein the primary relief surface (55) comprises non-coplanar primary relief surface sections (55').

11. The multilayer cutting insert (122) according to claim 1, wherein the cutting insert (22) is devoid of relief recesses (68).

12. The multilayer cutting insert (22) according to claim 1, wherein the first material is a super-abrasive material.

13. The multilayer cutting insert (22) according to claim 12, wherein the super-abrasive material is Polycrystalline Diamond (PCD).

14. A milling tool (10), the milling tool comprising:
a cylindrical tool head comprising an end surface (16) and a peripheral side surface (42) extending rearwardly from the end surface (16), the peripheral side surface (42) comprising an evacuation flute (24) and a cutting insert pocket (20) adjacent the flute;
a tool shank (14) extending rearwardly from the tool head; and
the multilayer cutting insert (22) according to claim 1 tangentially secured in the cutting insert pocket (20).

15. The milling tool according to claim 14, wherein at least a portion of the major cutting edge (58) has a positive axial angle and at least another portion has a negative axial angle.

16. The milling tool according to claim 14, wherein the major cutting edge (58) has only a positive axial angle ($\alpha$).

17. The milling tool according to claim 14, wherein the major cutting edge (58) has only a negative axial angle ($\beta$).

18. The milling tool according to claim 14, wherein the major cutting edge (58) of the multilayer cutting insert (22) comprises a plurality of cutting edge sections (62).

19. The milling tool according to claim 18, wherein one adjacent pair of the plurality of cutting edge sections (62) of the multilayer cutting insert (22) converge inwardly, and meet at a trough (53).

20. The milling tool according to claim 14, wherein the rake surface (52) of the multilayer cutting insert (22) comprises a plurality of rake surface sections (66).

21. The milling tool according to claim 14, wherein the multilayer cutting insert (22) has a maximum distance between the top and bottom surfaces (44, 46) defines a height H, a maximum distance between the first and second major side surfaces (38, 40) defines a width W, and a maximum distance between the front and rear minor side surfaces (48, 50) defines the length L; and wherein L>W, L>H and H>W.

22. The milling tool according to claim 14, wherein the multilayer cutting insert (22) is single-sided and non-indexable.

23. The milling tool according to claim 14, wherein the relief surface (54) of the multilayer cutting insert (22) comprises a non-uniform primary relief surface (55) which extends from the cutting edge (58) and connects with a secondary relief surface (56).

24. The milling tool according to claim 23, wherein the primary relief surface (55) of the multilayer cutting insert (22) comprises non-coplanar primary relief surface sections (55').

25. The milling tool according to claim 14, wherein the multilayer cutting insert (122) is devoid of relief recesses (68).

26. The milling tool according to claim 14, wherein the first material of the multilayer cutting insert (22) is a super-abrasive material.

27. A multilayer cutting insert (22) comprising a first layer (34) made of a first material and a second layer (36) made of a second material, the first material being harder than the second material,
the multilayer cutting insert (22) comprising opposing first and second major side surfaces (38, 40) and a peripheral side surface (42) extending therebetween;
the first major side surface (38) being formed in the first layer (34) and comprising a non-uniform relief surface (54);
the peripheral side surface (42) being formed in the two layers and comprising a non-uniform rake surface (52), and the rake surface (52) and the relief surface (54) intersecting at an edge, at least portion of which is a curved major cutting edge (58);
the rake surface (52) being formed in at least the first layer (34) and the relief surface (54) being formed only in the first layer (34), wherein:
the major cutting edge (58) comprises a plurality of cutting edge sections (62); and
one adjacent pair of the plurality of cutting edge sections (62) converge inwardly, and meet at a trough (53).

28. A multilayer cutting insert (22) comprising a first layer (34) made of a first material and a second layer (36) made of a second material, the first material being harder than the second material,
the multilayer cutting insert (22) comprising opposing first and second major side surfaces (38, 40) and a peripheral side surface (42) extending therebetween;
the first major side surface (38) being formed in the first layer (34) and comprising a non-uniform relief surface (54);
the peripheral side surface (42) being formed in the two layers and comprising a non-uniform rake surface (52), and the rake surface (52) and the relief surface (54) intersecting at an edge, at least portion of which is a curved major cutting edge (58);
the rake surface (52) being formed in at least the first layer (34) and the relief surface (54) being formed only in the first layer (34), wherein:
the relief surface (54) comprises a non-uniform primary relief surface (55) which extends from the cutting edge (58) and connects with a secondary relief surface (56); and
the primary relief surface (55) comprises non-coplanar primary relief surface sections (55').

\* \* \* \* \*